S. POOLE.
Pickle-Forks.
No. 206,482.   Patented July 30, 1878.
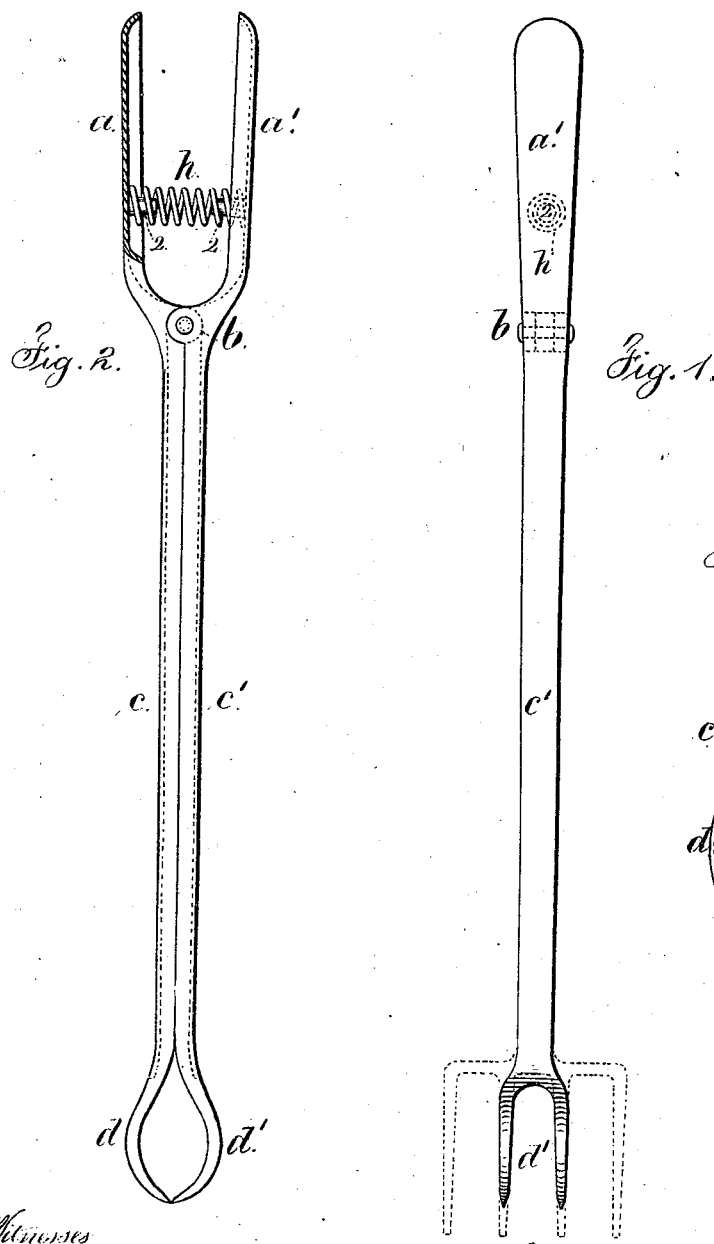

UNITED STATES PATENT OFFICE.

SAMUEL POOLE, OF BROOKLYN, NEW YORK.

IMPROVEMENT IN PICKLE-FORKS.

Specification forming part of Letters Patent No. 206,482, dated July 30, 1878; application filed June 28, 1878.

*To all whom it may concern:*

Be it known that I, SAMUEL POOLE, of Brooklyn, in the county of Kings and State of New York, have invented an Improvement in Lifters or Forks for Pickles, Preserves, &c., of which the following is a specification:

This device is intended for grasping the pickle, preserve, or other article; and it is composed of two levers having the grasping claws or prongs at one end, a spring near the other end for closing the claws, and lever handles for opening such claws.

By this construction the claws are easily opened by pressure upon the handles, the spring serving to close the claws when the pressure is relieved.

By this construction the parts of the fork are simple, easily kept clean, and they can be made of either wrought or cast metal at a small expense.

In the drawing, Figure 1 is a side view of the fork complete. Fig. 2 is an edge view, partially in section; and Figs. 3 and 4 represent the ends of the fork, of a shape adapted to sugar or other similar articles.

The handles $a$ $a'$ are connected by the joint $b$, and extend, as the lever-arms $c$ $c'$, to the grasping-claws $d$ $d'$.

The handles $a$ $a'$ are at a sufficient distance apart to allow for the introduction of the expansive helical spring $h$, the ends of which are steadied by the projections $q$ $q$ upon the inner faces of the levers. When these levers are pressed the claws $d$ $d'$ are opened, and when the pressure is relieved the claws are acted upon by the spring to grasp the article—such as a pickle, a preserve, a piece of meat, or a lump of sugar—that may be between such claws.

The claws are preferably of the curved and pointed form shown in Figs. 1 and 2; but they may be spoon-shaped, as in Figs. 3 and 4; or the claws may be larger in proportion, as indicated by dotted lines in Fig. 2. This last form is adapted to holding articles while being toasted or broiled.

The lever-arms $c$ $c'$ are made hollow, in the form of a half-cylinder, (see section, Fig. 5,) so as to combine strength and lightness; and the joint $b$ may be provided with a removable pin or screw, to facilitate construction or cleaning.

I claim as my invention—

1. The lifter formed of the handles $a$ $a'$, lever-arms $c$ $c'$, joint $b$, spring $h$, and claws or holders $d$ $d'$, substantially as set forth.

2. The lever-arms $c$ $c'$, formed as half-cylinders, in combination with the claws or holders $d$ $d'$, joint $b$, lever-handles $a$ $a'$, and spring $h$, as set forth.

Signed by me this 27th day of June, A. D. 1878.

SAMUEL POOLE.

Witnesses:
GEO. T. PINCKNEY,
CHAS. H. SMITH.